US010998129B2

(12) United States Patent
Ishima et al.

(10) Patent No.: US 10,998,129 B2
(45) Date of Patent: May 4, 2021

(54) METHOD FOR MANUFACTURING LAMINATED COIL COMPONENT

(71) Applicant: TDK CORPORATION, Tokyo (JP)

(72) Inventors: Yuya Ishima, Tokyo (JP); Shinichi Kondo, Tokyo (JP); Shunji Aoki, Tokyo (JP); Yasushi Matsuyama, Tokyo (JP); Yusuke Onezawa, Tokyo (JP); Hajime Azuma, Tokyo (JP)

(73) Assignee: TDK CORPORATION, Tokyo (JP)

( * ) Notice: Subject to any disclaimer, the term of this patent is extended or adjusted under 35 U.S.C. 154(b) by 326 days.

(21) Appl. No.: 15/895,039

(22) Filed: Feb. 13, 2018

(65) Prior Publication Data

US 2018/0233280 A1    Aug. 16, 2018

(30) Foreign Application Priority Data

Feb. 15, 2017   (JP) .............................. JP2017-026147

(51) Int. Cl.
| | |
|---|---|
| *H01F 7/06* | (2006.01) |
| *H01F 41/04* | (2006.01) |
| *H01F 27/28* | (2006.01) |
| *H01F 41/02* | (2006.01) |
| *B32B 37/00* | (2006.01) |
| *B32B 38/00* | (2006.01) |

(52) U.S. Cl.
CPC ....... *H01F 41/043* (2013.01); *H01F 27/2804* (2013.01); *B32B 37/025* (2013.01); *B32B 38/0036* (2013.01); *B32B 2307/202* (2013.01); *H01F 41/02* (2013.01); *H01F 2027/2809* (2013.01)

(58) Field of Classification Search
CPC .... H01F 41/043; H01F 41/02; H01F 27/2804; B32B 37/025; B32B 38/0036
See application file for complete search history.

(56) References Cited

U.S. PATENT DOCUMENTS 5,126,707 A * 6/1992 Ikeda .................. H01F 17/0006
                                                      333/185
6,466,120 B1   10/2002 Tokuda et al.
(Continued)

FOREIGN PATENT DOCUMENTS

| CN | 1406385 A | 3/2003 |
|---|---|---|
| CN | 102592817 A | 7/2012 |

(Continued)

*Primary Examiner* — Paul D Kim
(74) *Attorney, Agent, or Firm* — Oliff PLC

(57) ABSTRACT

A method for manufacturing a laminated coil component including an element and a conductor configuring a coil in the element includes a step of forming a conductor pattern including a configuration material of the conductor on a first base material by a photolithography method, a step of forming an element pattern including a configuration material of the element on a second base material by a photolithography method, the element pattern being formed such that a shape corresponding to a shape of the conductor pattern has been removed, a step of laminating the conductor pattern and the element pattern in a predetermined direction by repeatedly transferring the conductor pattern and the element pattern onto a support, and a step of performing thermal treatment for a laminate obtained by the step of laminating.

11 Claims, 11 Drawing Sheets

(56) References Cited

U.S. PATENT DOCUMENTS

| | | | | |
|---|---|---|---|---|
| 6,544,365 | B2 * | 4/2003 | Tokuda | H01F 41/043 |
| | | | | 156/235 |
| 6,603,380 | B2 * | 8/2003 | Tokuda | H01F 41/043 |
| | | | | 336/200 |
| 6,730,183 | B2 * | 5/2004 | Tokuda | B32B 18/00 |
| | | | | 156/235 |
| 2002/0074557 | A1 * | 6/2002 | Uda | H01J 9/02 |
| | | | | 257/88 |
| 2002/0105788 | A1 | 8/2002 | Tokuda et al. | |
| 2003/0027417 | A1 * | 2/2003 | Uda | H01J 9/022 |
| | | | | 438/618 |
| 2003/0029830 | A1 | 2/2003 | Takaya et al. | |
| 2004/0141297 | A1 | 7/2004 | Tokuda et al. | |
| 2009/0029289 | A1 * | 1/2009 | Miyasaka | G03F 7/031 |
| | | | | 430/285.1 |
| 2015/0020378 | A1 | 1/2015 | Li et al. | |

FOREIGN PATENT DOCUMENTS

| | | | |
|---|---|---|---|
| JP | 07202381 A | * | 8/1995 |
| JP | 2001-110640 A | | 4/2001 |
| JP | 2001-307937 A | | 11/2001 |
| JP | 2002-151341 A | | 5/2002 |
| JP | 2005-129793 A | | 5/2005 |
| JP | 2005-209816 A | | 8/2005 |
| JP | 2005-302844 A | | 10/2005 |
| JP | 2005-311223 A | | 11/2005 |

\* cited by examiner

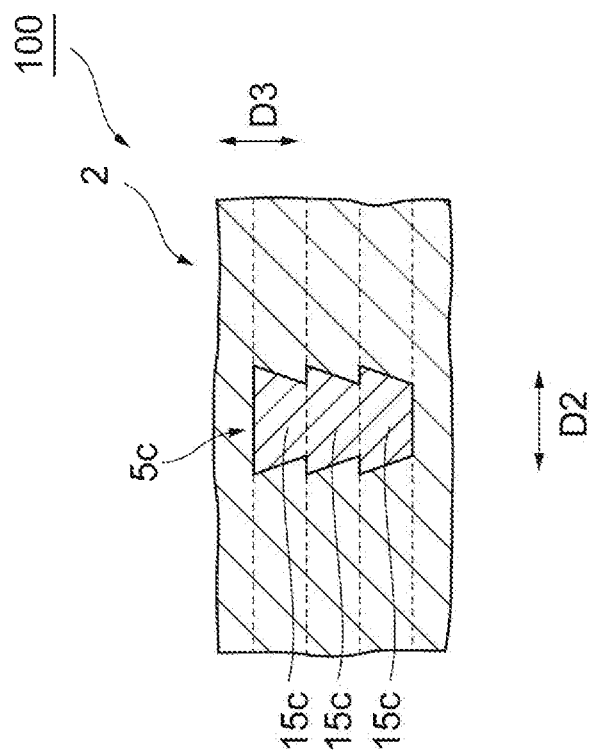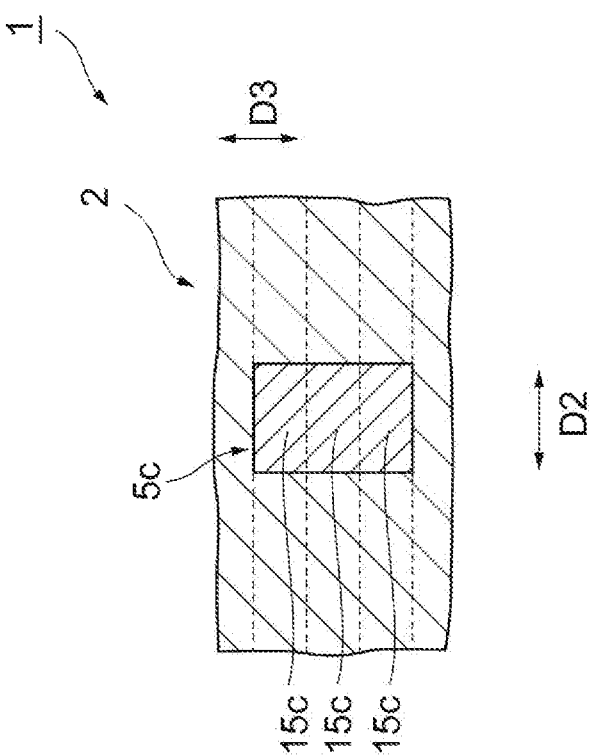

METHOD FOR MANUFACTURING LAMINATED COIL COMPONENT

TECHNICAL FIELD

One aspect of the present invention relates to a method for manufacturing a laminated coil component.

BACKGROUND

Known laminated coil components include an element and a conductor that configures a coil in the element (for example, see Japanese Unexamined Patent Publication No. 2001-307937). The method for manufacturing the laminated coil component includes a step of preparing a composite sheet by forming an internal electrode paste layer on a carrier film by a printing method and forming a ceramic green sheet layer around the internal electrode paste layer, and a step of transferring and laminating a plurality of the prepared composite sheets to the ceramic green sheet.

SUMMARY

In the above-described manufacturing method, the internal electrode paste layer and the ceramic green sheet layer do not overlap each other. Therefore, as compared with a conventional manufacturing method for laminating ceramic green sheets provided with a conductor pattern, lamination shift and collapse of the internal electrode paste layer, that is, a conductor pattern are suppressed. The lamination shift of the conductor patterns is a phenomenon in which adjacent conductor patterns in a laminating direction are laminated while being shifted from each other in a direction orthogonal to the laminating direction. The collapse of the conductor pattern is a phenomenon in which the conductor pattern collapses in the laminating direction.

One aspect of the present invention provides a method for manufacturing a laminated coil component, which enables further suppression of lamination shift and collapse of a conductor pattern.

The inventors of the present invention have conducted research and study for a method for manufacturing a laminated coil component, which enables further suppression of lamination shift and collapse of a conductor pattern. As a result, the inventors of the present invention have found the following fact. That is, according to the printing method, even if attempting to form a conductor pattern in a rectangular shape in cross section on a base material, the conductor pattern is likely to spread in a width direction on the base material. Due to this fact, lamination shift and collapse of a conductor pattern may occur.

Therefore, a method for manufacturing a laminated coil component according to one aspect of the present invention is a method for manufacturing a laminated coil component including an element and a conductor configuring a coil in the element, the method including a step of forming a conductor pattern including a configuration material of the conductor on a first base material by a photolithography method, a step of forming an element pattern including a configuration material of the element on a second base material by a photolithography method, the element pattern being formed such that a shape corresponding to a shape of the conductor pattern has been removed, a step of laminating the conductor pattern and the element pattern in a predetermined direction by repeatedly transferring the conductor pattern and the element pattern onto a support, and a step of performing thermal treatment for a laminate obtained by the step of laminating.

In the method for manufacturing a laminated coil component, the conductor pattern and the element pattern are repeatedly formed on different base materials, and are then repeatedly transferred and laminated onto the support. In the element pattern, the shape corresponding to the shape of the conductor pattern has been removed. Therefore, the element pattern and the conductor pattern do not overlap each other, and lamination shift and collapse of the conductor patterns can be suppressed. Further, both the conductor pattern and the element pattern are formed by a photolithography method. Therefore, the section shape of the conductor pattern can be brought closer to a rectangle as compared with a case where the conductor pattern is formed by a printing method. The element pattern can also be accurately formed corresponding to the conductor pattern. As a result, lamination shift and collapse of the conductor pattern can be further suppressed.

In the method for manufacturing a laminated coil component according to one aspect of the present invention, a pair of the conductor patterns that at least partially overlaps each other when layered in the predetermined direction may be formed in the step of forming a conductor pattern. In the step of laminating, the pair of conductor patterns may be laminated in such a way as to be adjacent to each other in the predetermined direction. In this case, the conductor patterns can be connected without through holes.

In the method for manufacturing a laminated coil component according to one aspect of the present invention, a pair of the conductor patterns that entirely overlaps each other when layered in the predetermined direction may be formed in the step of forming a conductor pattern. In the step of laminating, the pair of conductor patterns may be laminated in such a way as to be adjacent to each other in the predetermined direction. In this case, the aspect ratio of the conductor can be increased, and the Q factor (quality factor) of the coil can be improved.

The method for manufacturing a laminated coil component according to one aspect of the present invention may further include a step of forming an element forming layer including the configuration material of the element on a third base material. In the step of laminating, the element forming layer, the conductor pattern, and the element pattern may be laminated in the predetermined direction by transferring the element forming layer on the support, then repeatedly transferring the conductor pattern and the element pattern, and further transferring the element forming layer. In this case, a laminated coil component in which both end portions in the predetermined direction are configured from the element can be manufactured.

In the method for manufacturing a laminated coil component according to one aspect of the present invention, the laminated coil component may further include a core portion inside the coil as viewed from the predetermined direction. In the step of forming an element pattern, the element pattern may be formed such that a shape corresponding to a shape of the core portion has been removed. In this case, a laminated coil component having the core portion can be manufactured.

The method for manufacturing a laminated coil component according to one aspect of the present invention may further include a step of forming a core portion pattern including a configuration material of the core portion on a fourth base material by a photolithography method. In the step of laminating, the core portion pattern may be laminated together with the conductor pattern and the element pattern in the predetermined direction by repeatedly transferring the core portion pattern onto the support together with the conductor pattern and the element pattern. In this case, a laminated coil component having the core portion made of, for example, a magnetic material can be manufactured.

The method for manufacturing a laminated coil component according to one aspect of the present invention may further include a step of forming a spacer pattern including a configuration material of a spacer on a fifth base material by a photolithography method. The laminated coil component may further include the spacer disposed between the conductors in a predetermined direction. In the step of forming an element pattern, the element pattern may be formed such that a shape corresponding to a shape of the spacer pattern has been removed. In the step of laminating, the spacer pattern may be laminated together with the conductor pattern and the element pattern in the predetermined direction by repeatedly transferring the spacer pattern onto the support together with the conductor pattern and the element pattern. In this case, a laminated coil component provided with a spacer between the conductors can be manufactured.

In the method for manufacturing a laminated coil component according to one aspect of the present invention, the element pattern may be transferred after the conductor pattern is transferred in the step of laminating. In this case, the transfer properties of the conductor pattern can be improved.

BRIEF DESCRIPTION OF THE DRAWINGS

FIGS. 8A and 8B are sectional views for describing section shapes of a coil conductor.

DETAILED DESCRIPTION

Figure 1:
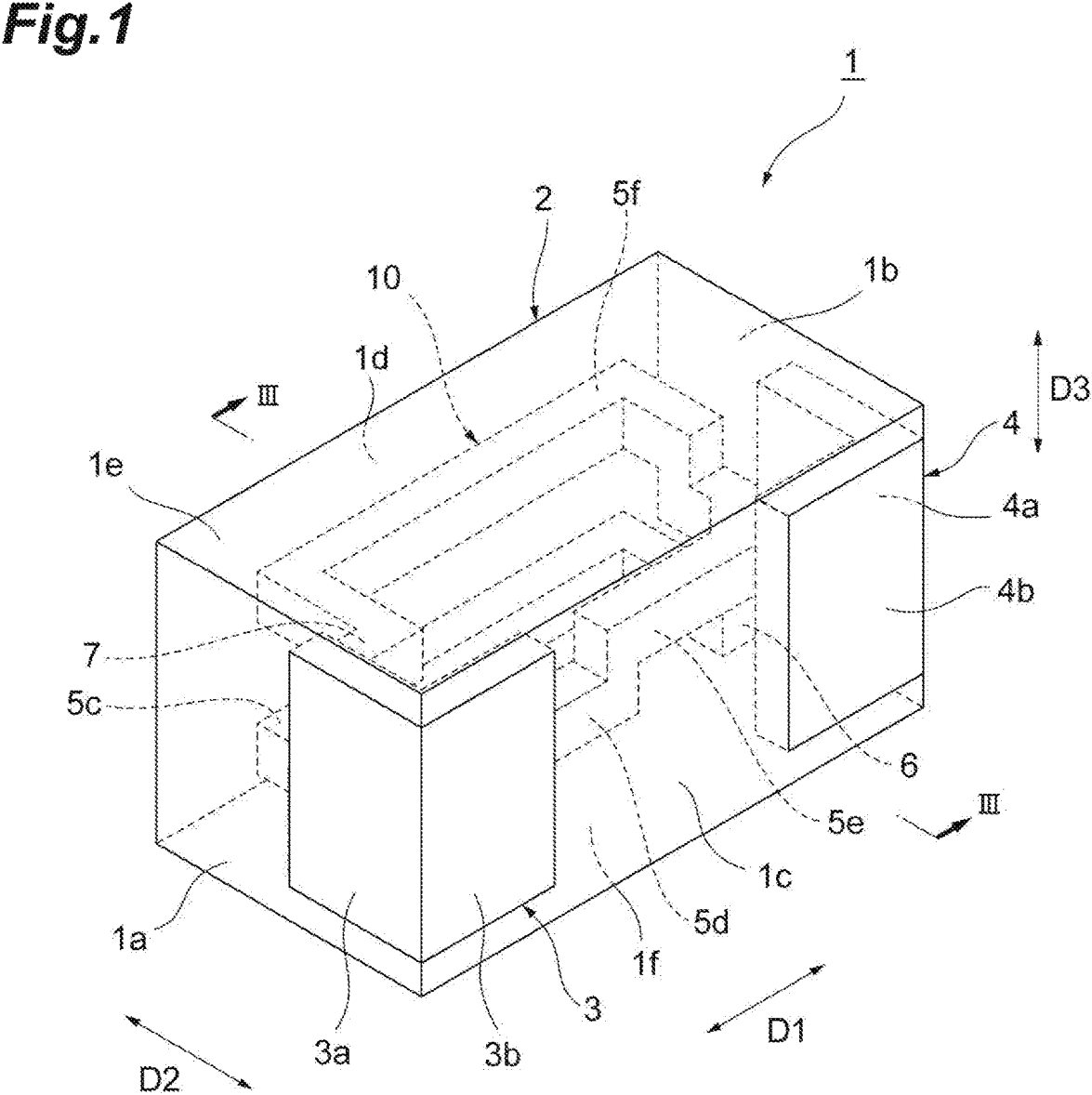
FIG. 1 is a perspective view of a laminated coil component manufactured by a method for manufacturing a laminated coil component according to an embodiment.

Hereinafter, embodiments will be described in detail with reference to the accompanying drawings. In the description, the same reference numeral is used for the same elements or elements having the same function, and redundant description is omitted.

[Laminated Coil Component]

Figure 2:
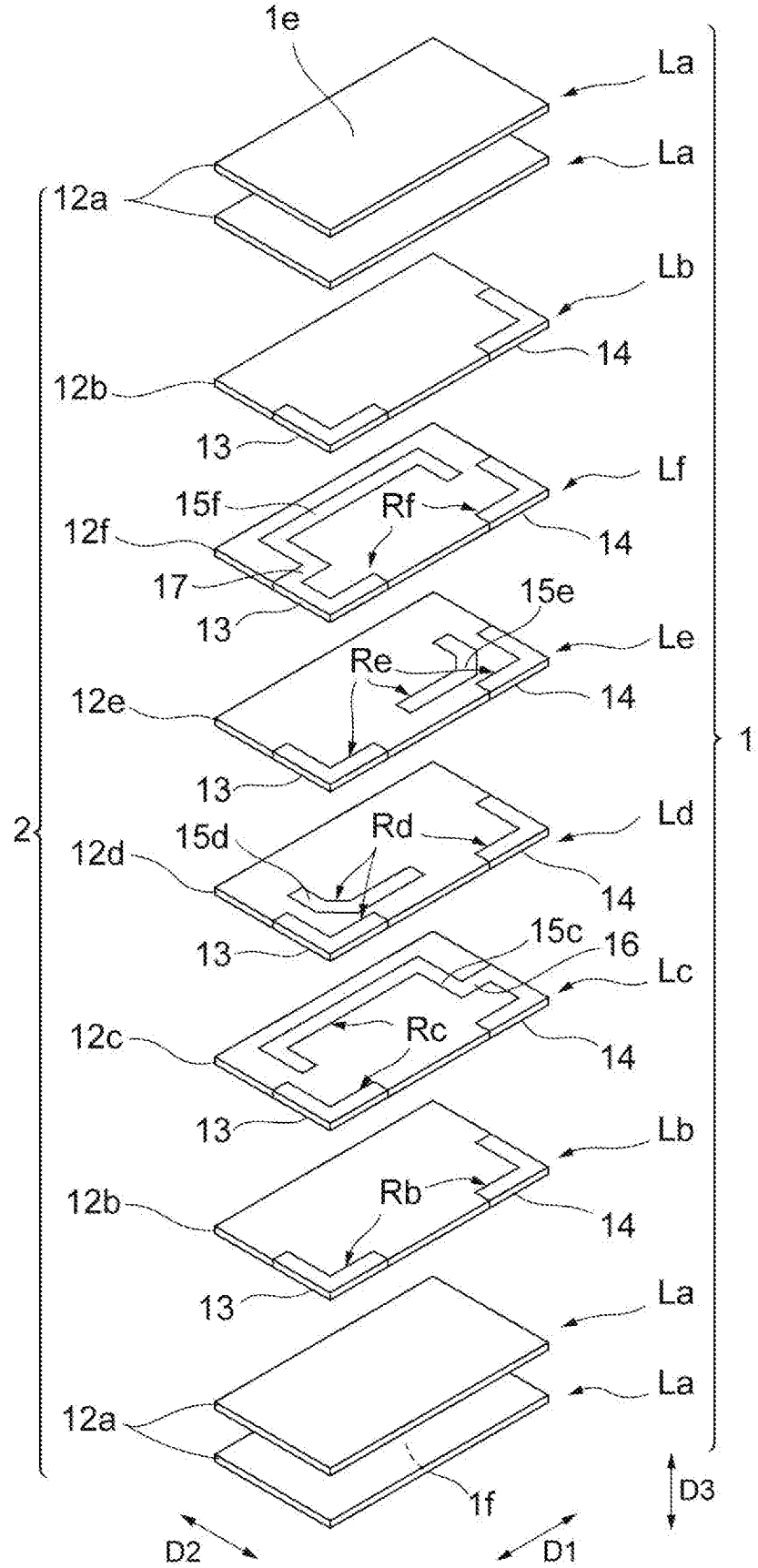
FIG. 2 is an exploded perspective view of the laminated coil component illustrated in FIG. 1.
Figure 3:
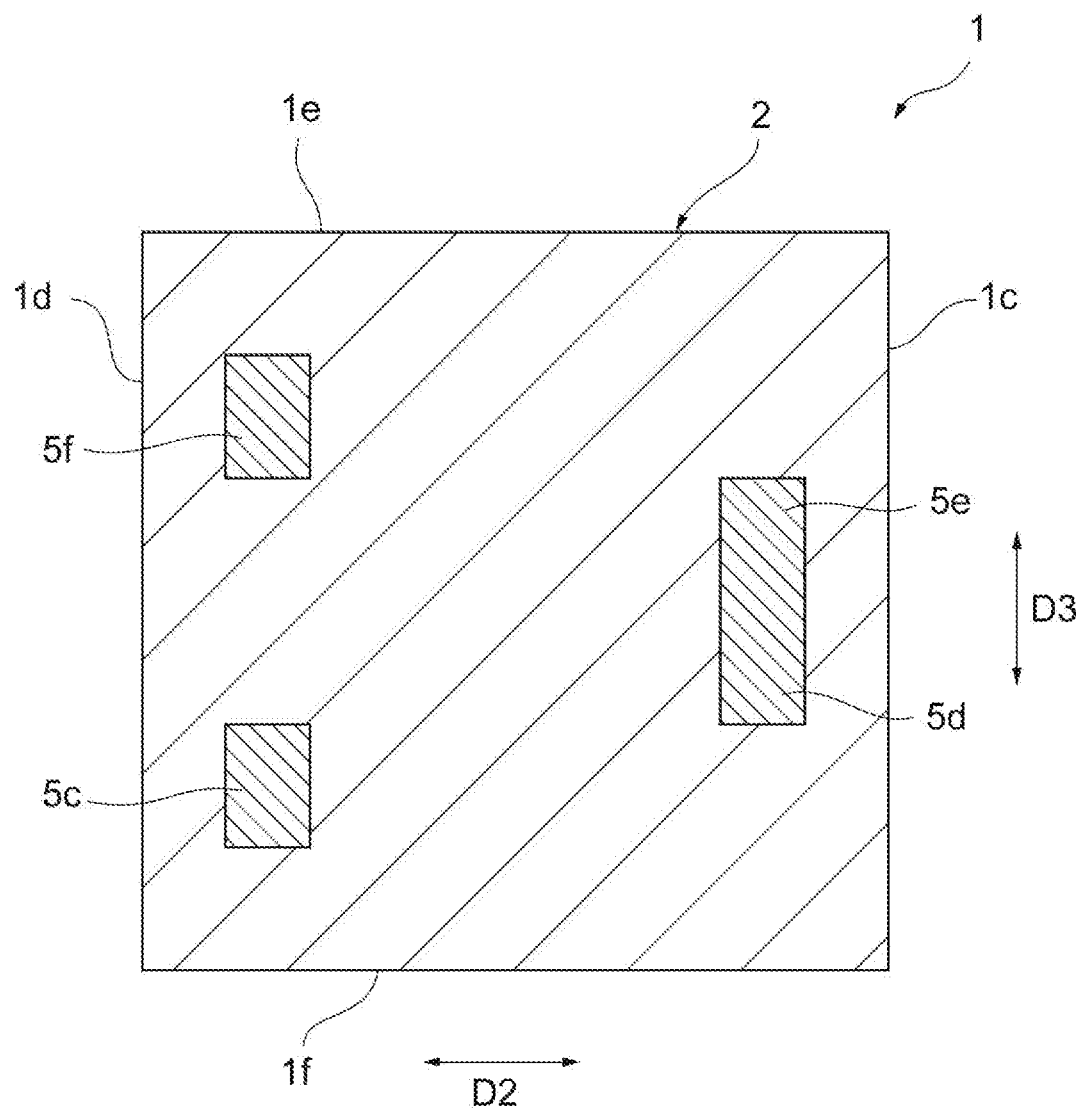
FIG. 3 is a sectional view of the laminated coil component taken along the line of FIG. 1.

A laminated coil component according to an embodiment will be described with reference to FIGS. 1 to 3. FIG. 1 is a perspective view of a laminated coil component according to an embodiment. FIG. 2 is an exploded perspective view of the laminated coil component illustrated in FIG. 1. FIG. 3 is a sectional view of the laminated coil component taken along the line of FIG. 1.

As illustrated in FIG. 1, a laminated coil component 1 according to an embodiment has a rectangular parallelepiped shape. The rectangular parallelepiped shape includes a rectangular parallelepiped shape with chamfered corner portions and ridge portions, and a rectangular parallelepiped shape with rounded corner portions and ridge portions. The laminated coil component 1 has end faces $1a$ and $1b$ and side faces $1c$, $1d$, $1e$, and $1f$ as an outer surface. The end faces $1a$ and $1b$ are opposed to each other. The side faces $1c$ and $1d$ are opposed to each other. The side faces $1e$ and $1f$ are opposed to each other. Hereinafter, an opposing direction of the end faces $1a$ and $1b$ is a direction D1, an opposing direction of the side faces $1c$ and $1d$ is a direction D2, and an opposing direction of the side faces $1e$ and $1f$ is a direction D3. The directions D1, D2, and D3 are approximately orthogonal to one another.

The end faces $1a$ and $1b$ extend in the direction D2 in such a way as to connect the side faces $1c$ and $1d$. The end faces $1a$ and $1b$ also extend in the direction D3 in such a way as to connect the side faces $1e$ and $1f$. The side faces $1c$ and $1d$ extend in the direction D1 in such a way as to connect the end faces $1a$ and $1b$. The side faces $1c$ and $1d$ also extend in the direction D3 in such a way as to connect the side faces $1e$ and $1f$. The side faces $1e$ and $1f$ extend in the direction D2 in such a way as to connect the side faces $1c$ and $1d$. The side faces $1e$ and $1f$ also extend in the direction D1 in such a way as to connect the end faces $1a$ and $1b$. The side face $1c$ is a surface opposed to another electronic device when the laminated coil component 1 is mounted on another electronic device (not illustrated) (for example, a circuit substrate or an electronic component).

The length of the laminated coil component 1 in the direction D1 is longer than the length of the laminated coil component 1 in the direction D2 and the length of the laminated coil component 1 in the direction D3. The length in the direction D2 of the laminated coil component 1 and the length in the direction D3 of the laminated coil component 1 are equal to each other. That is, in the present embodiment, the end faces $1a$ and $1b$ have a square shape, and the side faces $1c$, $1d$, $1e$, and $1f$ have a rectangular shape. The length of the laminated coil component 1 in the direction D1 may be equal to, or longer or shorter than the length of the laminated coil component 1 in the direction D2 and the length of the laminated coil component 1 in the length in the direction D3. The length of the laminated coil component 1 in the direction D2 and the length in the direction D3 of the laminated coil component 1 may be different from each other.

The "equivalent" in the present embodiment may include values having a slight difference or a manufacturing error that falls within a preset range, in addition to equal values. For example, if a plurality of values falls within a range of ±5% of an average value of the plurality of values, the plurality of values is defined to be equivalent.

As illustrated in FIGS. 1 to 3, the laminated coil component 1 includes an element 2, external electrodes 3 and 4, a plurality of coil conductors 5, and connection conductors 6 and 7.

The element 2 has an approximately rectangular parallelepiped shape, and forms a part of each of the end faces 1a and 1b and the side face 1c, and all of the side faces 1d, 1e, and 1f. The element 2 is configured from a plurality of element layers 12a to 12f laminated in the direction D3. A specific lamination structure will be described below. In the actual element 2, the plurality of element layers 12a to 12f is integrated to such an extent that boundaries between the element layers cannot be visually recognized. The element layers 12a to 12f are configured from, for example, a magnetic material (Ni—Cu—Zn ferrite material, Ni—Cu—Zn—Mg ferrite material, or Ni—Cu ferrite material). The magnetic material that configures the element layers 12a to 12f may contain a Fe alloy or the like. The element layers 12a to 12f may be configured from a nonmagnetic material (a glass ceramic material, a dielectric material, or the like).

The external electrodes 3 and 4 are separated from each other in the direction D1 and disposed on the outer surface of the element 2. The external electrodes 3 and 4 have, for example, the same shape. The external electrodes 3 and 4 have, for example, an L shape as viewed from the direction D3. Electrolytic plating or electroless plating is applied to the external electrodes 3 and 4, thereby to form a plating layer on outer surfaces thereof. The plating layer contains Ni, Sn, and Au, for example.

The external electrode 3 has electrode portions 3a and 3b. The electrode portions 3a and 3b are integrally formed. The electrode portions 3a and 3b have a rectangular plate shape. The electrode portion 3a is exposed on the end face 1a and configures a part of the end face 1a. The electrode portion 3b is exposed on the side face 1c and configures a part of the side face 1c. The external electrode 3 is configured by laminating, in the direction D3, a plurality of external electrode layers 13 having an L shape as viewed from the direction D3. In the actual external electrode 3, the plurality of external electrode layers 13 is integrated to such an extent that boundaries between the layers cannot be visually recognized.

The external electrode 4 has electrode portions 4a and 4b. The electrode portions 4a and 4b are integrally formed. The electrode portions 4a and 4b have a rectangular plate shape. The electrode portion 4a is exposed on the end face 1b and configures a part of the end face 1b. The electrode portion 4b is exposed on the side face 1c and configures a part of the side face 1c. The external electrode 4 is configured by laminating, in the direction D3, a plurality of external electrode layers 14 having an L shape as viewed from the direction D3. In the actual external electrode 4, the plurality of external electrode layers 14 is integrated to such an extent that boundaries between the layers cannot be visually recognized.

A plurality of coil conductors 5c, 5d, 5e, and 5f is connected to one another to configure a coil 10 in the element 2. The coil conductors 5c, 5d, 5e, and 5f are disposed in such a way as to at least partially overlap one another as viewed from the direction D3. The coil conductors 5c, 5d, 5e, and 5f are disposed to be separated from the end faces 1a and 1b and the side faces 1c, 1d, 1e, and 1f.

The coil conductor 5c configures one end portion of the coil 10. One end portion of the coil conductor 5c and the connection conductor 6 are adjacent to each other in the direction D1 and are connected to each other. The other end portion of the coil conductor 5c and one end portion of the coil conductor 5d are adjacent to each other in the direction D3 and are connected to each other. The other end portion of the coil conductor 5d and one end portion of the coil conductor 5e are adjacent to each other in the direction D3 and are connected to each other. The other end portion of the coil conductor 5e and one end portion of the coil conductor 5f are adjacent to each other in the direction D3 and are connected to each other. The other end portion of the coil conductor 5c is connected to the connection conductor 7.

The coil conductors 5c, 5d, 5e, and 5f are configured by laminating a plurality of coil conductor layers 15c, 15d, 15e, and 15f in the direction D3. That is, the plurality of coil conductor layers 15c, 15d, 15e, and 15f is disposed in such a way that all the coil conductor layers overlap one another as viewed from the direction D3. The coil conductors 5c, 5d, 5e, and 5f may be configured from one set of coil conductor layers 15c, 15d, 15e, and 15f. FIG. 2 illustrates only one set of coil conductor layers 15c, 15d, 15e, and 15f. In the actual coil conductors 5c, 5d, 5e, and 5f, the plurality of coil conductor layers 15c, 15d, 15e, and 15f is integrated to such an extent that boundaries between the layers cannot be visually recognized.

The connection conductor 6 extends in the direction D1 and is connected to the coil conductor 5c of the coil 10 and the electrode portion 4a. The connection conductor 7 extends in the direction D1 and is connected to the coil conductor 5f and the electrode portion 3a. The connection conductors 6 and 7 are configured by laminating a plurality of connection conductor layers 16 and 17 in the direction D3. In FIG. 2, only one set of connection conductor layers 16 and 17 is illustrated. In the actual connection conductors 6 and 7, the plurality of connection conductor layers 16 and 17 is integrated to such an extent that boundaries between the layers cannot be visually recognized.

The external electrode layers 13 and 14, the coil conductor layers 15c, 15d, 15e, and 15f, and the connection conductor layers 16 and 17 are configured from a conductive material (for example, Ag or Pd). These layers may be configured from the same material or different materials. These layers have an approximately rectangular shape in cross section.

The laminated coil component 1 has a plurality of layers La, Lb, Lc, Ld, Le, and Lf. For example, the laminated coil component 1 is configured by laminating, from the side of the side face 1f, two layers La, one layer Lb, three layers Lc, three layers Ld, three layers Le, three layers Lf, one layer Lb, and two layers La. In FIG. 2, each one of the three layers Lc, three layers Ld, three layers Le, and three layers Lf is illustrated, and the other two are not illustrated.

The layer La is configured from the element layer 12a.

The layer Lb is configured by combining the element layer 12b and the external electrode layers 13 and 14 with each other. The element layer 12b is provided with defect portions Rb. The defect portions Rb have shapes corresponding to the shapes of the external electrode layers 13 and 14. The external electrode layers 13 and 14 are fit to the defect portions Rb. The element layer 12b and the entire external electrode layers 13 and 14 have a complementary relationship with each other.

The layer Lc is configured by combining the element layer 12c, the external electrode layers 13 and 14, the coil conductor layer 15c, and the connection conductor layer 16 with one another. The element layer 12c is provided with defect portions Re. The defect portions Re have shapes corresponding to the shapes of the external electrode layers 13 and 14, the coil conductor layer 15c, and the connection conductor layer 16. The external electrode layers 13 and 14, the coil conductor layer 15c, and the connection conductor layer 16 are fit to the defect portions Rc. The element layer 12c, the external electrode layers 13 and 14, the coil conductor layer 15c, and the entire connection conductor layer 16 have a complementary relationship with one another.

The layer Ld is configured by combining the element layer 12d, the external electrode layers 13 and 14 and the coil conductor layer 15d with one another. The element layer 12d is provided with defect portions Rd. The defect portions Rd have shapes corresponding to the shapes of the external electrode layers 13 and 14 and the coil conductor layer 15d. The external electrode layers 13 and 14, and the coil conductor layer 15d are fit to the defect portions Rd. The element layer 12d, the external electrode layers 13 and 14, and the entire coil conductor layer 15d have a complementary relationship with one another.

The layer Le is configured by combining the element layer 12e, the external electrode layers 13 and 14 and the coil conductor layer 15e with one another. The element layer 12e is provided with defect portions Re. The defect portions Re have shapes corresponding to the shapes of the external electrode layers 13 and 14 and the coil conductor layer 15e. The external electrode layers 13 and 14, and the coil conductor layer 15e are fit to the defect portions Re. The element layer 12e, the external electrode layers 13 and 14, and the entire coil conductor layer 15e have a complementary relationship with one another.

The layer Lf is configured by combining the element layer 12f, the external electrode layers 13 and 14, the coil conductor layer 15f, and the connection conductor layer 17 with one another. The element layer 12f is provided with defect portions Rf. The defect portions Rf have shapes corresponding to the shapes of the external electrode layers 13 and 14, the coil conductor layer 15f, and the connection conductor layer 17. The external electrode layers 13 and 14, the coil conductor layer 15f, and the connection conductor layer 17 are fit to the defect portions Rf. The element layer 12f, the external electrode layers 13 and 14, the coil conductor layer 15f, and the entire connection conductor layer 17 have a complementary relationship with one another.

The widths of the defect portions Rb, Rc, Rd, Re, and Rf (hereinafter, the widths of the defect portions) are basically set in such a way as to be larger than the widths of the external electrode layers 13 and 14, the coil conductor layers 15c, 15d, 15e, and 15f, and the connection conductor layers 16 and 17 (hereinafter, the widths of the conductor portions). To improve the adhesive property among the element layers 12b, 12c, 12d, 12e, and 12f, the external electrode layers 13 and 14, the coil conductor layers 15c, 15d, 15e, and 15f, and the connection conductor layers 16 and 17, the widths of the defect portions may be purposely set in such a way as to be narrower than the widths of the conductor portions. A value obtained by subtracting the width of the conductor portion from the width of the defect portion is favorably, for example, from −3 μm to 10 μm, both inclusive, and more favorably from 0 μm to 10 μm, both inclusive.

[Method for Manufacturing Laminated Coil Component]

Figure 4:
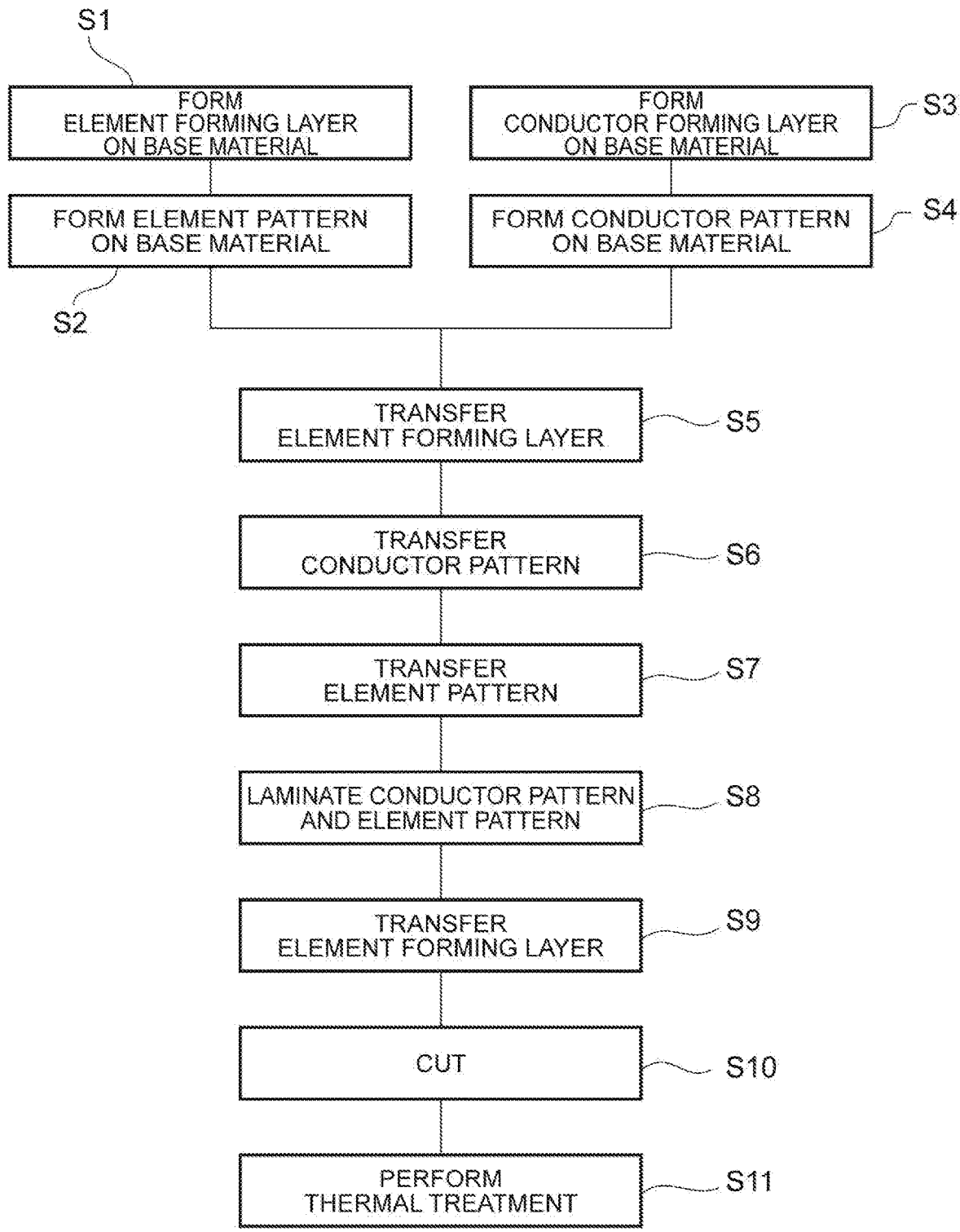
FIG. 4 is a flowchart illustrating a method for manufacturing a laminated coil component according to an embodiment.

A method for manufacturing the laminated coil component 1 according to an embodiment will be described. FIG. 4 is a flowchart illustrating a method for manufacturing a laminated coil component according to an embodiment. FIGS. 5A to 5G, and FIGS. 6A and 6B are sectional views conceptually illustrating a method for manufacturing a laminated coil component according to an embodiment. The sectional views of FIGS. 5A to 5G and FIGS. 6A and 6B are conceptually illustrated and are not necessarily matched with actual sectional views of the laminated coil component 1.

Figure 5A:
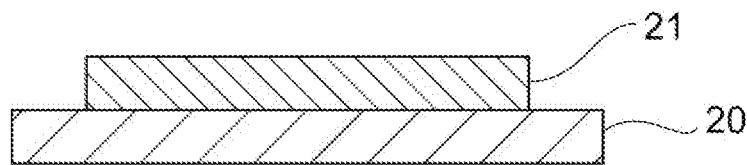
FIGS. 5A to 5G are sectional views conceptually illustrating a method for manufacturing a laminated coil component according to an embodiment.
Figure 5B:
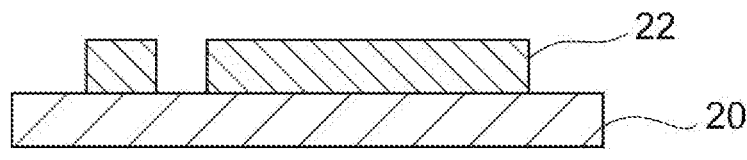

First, as illustrated in FIG. 5A, an element forming layer 21 is formed on a base material 20 (step S1). The base material 20 is, for example, a PET film. The element forming layer 21 is forming by applying an element paste containing a configuration material of the above-described element layers 12a to 12f and a photosensitive material to the base material 20. The photosensitive material contained in the element paste may be either a negative type or a positive type, and a known photosensitive material can be used. Next, as illustrated in FIG. 5B, the element forming layer 21 is exposed and developed by a photolithography method using a Cr mask, for example, to form an element pattern 22 on the base material 20 (step S2). The element pattern 22 is formed such that a shape correspond to the shape of a conductor pattern 32 described below has been removed. The element pattern 22 is a layer to serve as the element layers 12b to 12f after thermal treatment. That is, in step S2, the element pattern 22 provided with a defect portion 23 that is to serve as the defect portions Re, Rd, Re, and Rf is formed. The "photolithography method" of the present embodiment is not limited to a type of mask or the like, and may be any method of processing a desired pattern by exposing and developing a layer to be processed containing a photosensitive material.

Figure 5C:
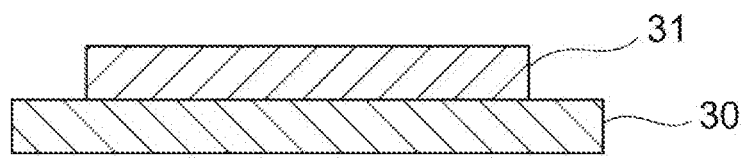
Figure 5D:
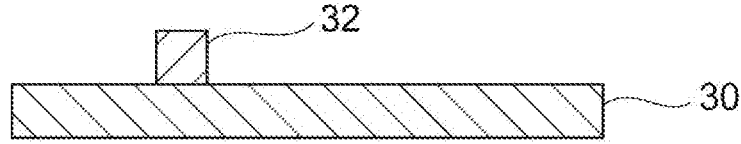

Meanwhile, as illustrated in FIG. 5C, a conductor forming layer 31 is formed on a base material 30 (step S3). The base material 30 is, for example, a PET film. The conductor forming layer 31 is formed by applying a conductor paste containing configuration materials of the external electrode layers 13 and 14, the coil conductor layers 15c, 15d, 15e, and 15f, and the connection conductor layer 16 and 17, and a photosensitive material to the base material 30. The photosensitive material contained in the conductor paste may be either a negative type or a positive type, and a known photosensitive material can be used. Next, as illustrated in FIG. 5D, the conductor forming layer 31 is exposed and developed by a photolithography method using a Cr mask, for example, to form the conductor pattern 32 on the base material 30 (step S4). The conductor pattern 32 is a layer to serve as the external electrode layers 13 and 14, the coil conductor layers 15c, 15d, 15e, and 15f and the connection conductor layer 16 and 17 after thermal treatment.

Figure 5E:
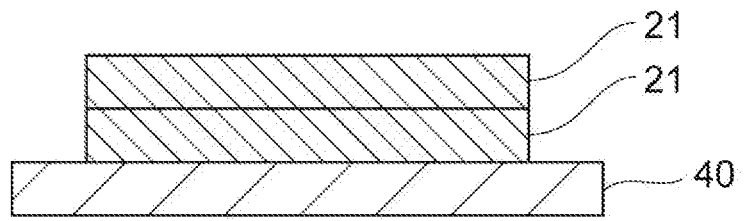

Next, as illustrated in FIG. 5E, the element forming layer 21 for Tied in step S1 above is transferred from the base material 20 onto a support 40 (step S5). A plurality of the element forming layers 21 may be laminated on the support 40 by repeating step S5 a plurality of times. In the present embodiment, two element forming layers 21 are laminated on the support 40 by repeating step S5 twice. These element forming layers 21 are layers to serve as the layer La after thermal treatment.

Figure 5F:
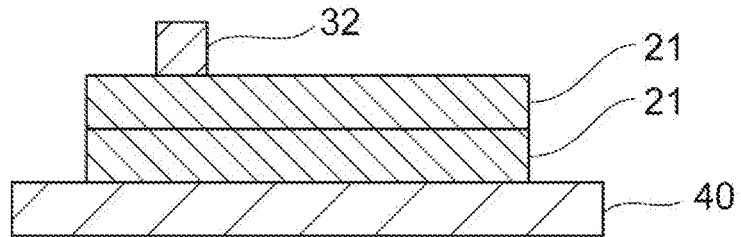
Figure 5G:
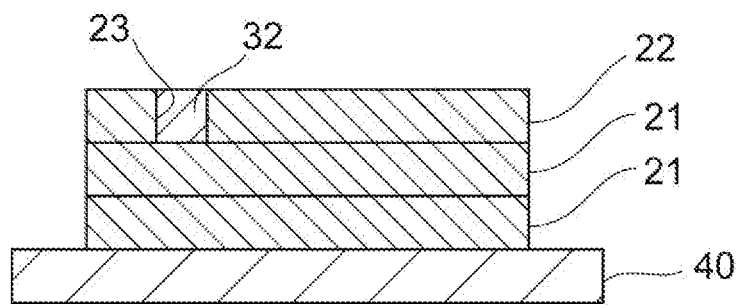
Figure 6A:
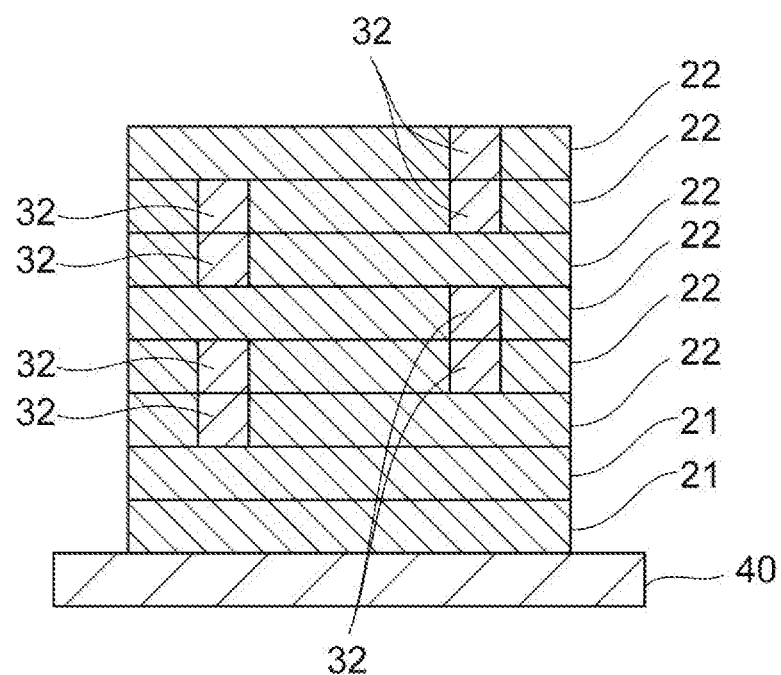
FIGS. 6A and 6B are sectional views conceptually illustrating a method for manufacturing a laminated coil component according to an embodiment.

Next, the conductor pattern 32 and the element pattern 22 are repeatedly transferred onto the support 40, so that the conductor patterns 32 and the element patterns 22 are laminated in the direction D3. Specifically, first, as illustrated in FIG. 5F, the conductor pattern 32 formed in step S4 above is transferred from the base material 30 onto the element forming layer 21 transferred in step S5 (step S6). Next, as illustrated in FIG. 5G, the element pattern 22 formed in step S2 above is transferred from the base material 20 onto the element forming layer 21 transferred in step S5 (step S7). The conductor pattern 32 transferred onto the element forming layer 21 in step S6 above is combined with the defect portion 23 of the element pattern 22, so that the element pattern 22 and the conductor pattern 32 are in the same layer. Further, as illustrated in FIG. 6A, steps S6 and S7 above are repeated, and the element pattern 22 and the conductor pattern 32 are laminated in a state of being combined with each other (step S8). According to this process, layers to serve as the layers Lb, Lc, Ld, Le, and Lf after thermal treatment are laminated. In step S8 above, steps S6 and S7 above are not necessarily repeated on a one-to-one basis. For example, step S6 above may be repeated more than step S7 above. According to this process, for example, the conductor pattern 32 corresponding only to the external electrode layers 13 and 14 may be transferred more than the element pattern 22.

Figure 6B:
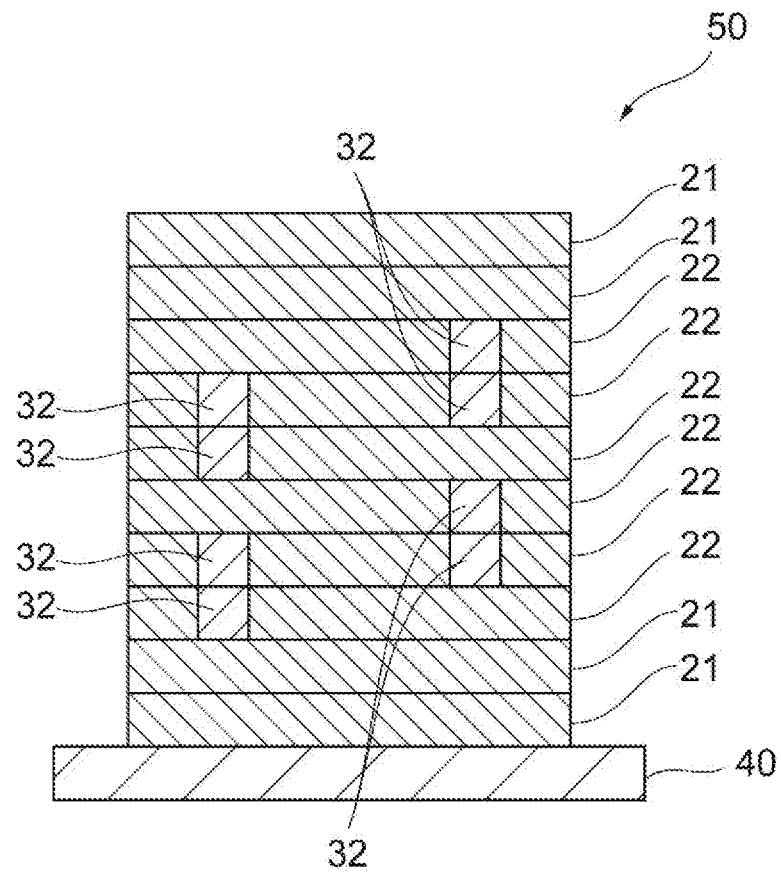

Next, as illustrated in FIG. 6B, the element forming layer 21 formed in step S1 above is transferred from the base material 20 onto the layers laminated in step S8 above (step S9). A plurality of element forming layers 21 may be laminated on the layer by repeating step S9 a plurality of times. In the present embodiment, two layers of the element forming layers 21 are laminated on the layer from the base material 20 by repeating step S9 twice. These element forming layers 21 are layers to serve as the layer La after thermal treatment.

As described above, a laminate 50 that configures the laminated coil component 1 after thermal treatment is formed on the support 40. For example, a layer provided with a cutting mark or a mark indicating a direction of a chip (laminated coil component 1) or a colored layer may be further laminated as needed to form the laminate 50.

Next, the obtained laminate 50 is cut into a predetermined size (step S10).

Next, after a debinding process is performed for the cut laminate 50, thermal treatment is performed (step S11). The thermal treatment temperature is, for example, about 850 to 900° C. With the process, the laminated coil component 1 is obtained. Electrolytic plating or electroless plating may be applied to the external electrodes 3 and 4 as necessary.

Figure 7:
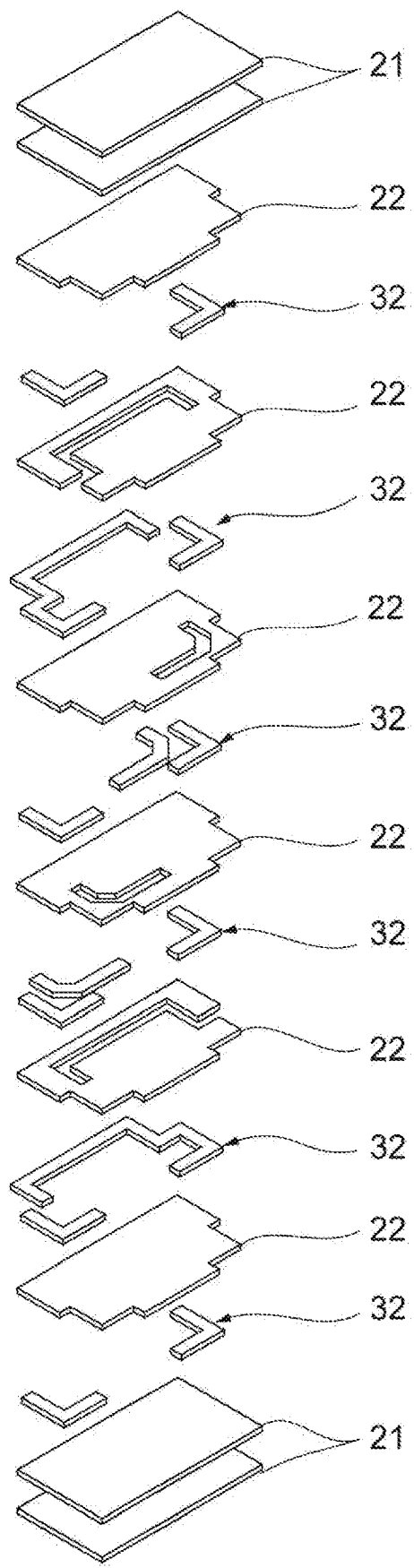
FIG. 7 is a perspective view for describing a method for manufacturing a laminated coil component according to an embodiment.

FIG. 7 is a perspective view for describing a method for manufacturing a laminated coil component according to an embodiment. FIG. 7 illustrates the element forming layers 21, the conductor patterns 32, and the element patterns 22, which are laminated in the method for manufacturing the laminated coil component 1, in order of lamination from the bottom to the top in FIG. 7. Note that, in FIG. 7, similarly to FIG. 2, each one of the conductor patterns 32 and the element patterns 22 included in the layers that serve as the layers Lc, Ld, Le, and Lf in FIG. 2 is illustrated, and the other two are not illustrated.

In step S4 above, a pair of the conductor patterns 32 at least partially overlapping each other when layered in the direction D3 is formed, and in step S8 above, the pair of conductor patterns 32 is laminated in such a way as to be adjacent to each other in the direction D3. With the steps, the conductor patterns 32 to serve as the coil conductor layers 15c, 15d, 15e, and 15f in FIG. 2 can be connected without through holes, as illustrated in FIG. 7. In step S4 above, a pair of the conductor patterns 32 entirely overlapping each other when layered in the direction D3 is formed, and in step S8 above, the pair of conductor patterns 32 is laminated in such a way as to be adjacent to each other in the direction D3. With the steps, the conductor patterns 32 to serve as the coil conductor layers 15c, 15d, 15e, and 15f in FIG. 2 can be laminated to increase an aspect ratio of the coil conductors 5c, 5d, 5e, and 5f. As a result, a Q value of the coil 10 can be improved.

As described above, in the present embodiment, after the conductor pattern 32 and the element pattern 22 are formed on the different base materials 20 and 30, the conductor pattern 32 and the element pattern 22 are repeatedly transferred and laminated on the support 40. In the element pattern 22, the shape corresponding to the shape of the conductor pattern 32 has been removed. Therefore, the element pattern 22 and the conductor pattern 32 do not overlap each other. With the configuration, lamination shift in which the conductor pattern 32 is laminated while being shifted in the direction D1 and in the direction D2 with respect to the conductor pattern 32 adjacent in the direction D3 is suppressed. Further, collapse of the conductor pattern 32 in the direction D3 is suppressed.

FIGS. 8A and 8B are sectional views for describing section shapes of a coil conductor. Here, the coil conductor 5c will be described as an example. FIG. 8A is a sectional view of the coil conductor 5c of the laminated coil component 1 obtained by the manufacturing method according to an embodiment. FIG. 8B is a sectional view of a coil conductor 5c of a laminated coil component 100 obtained by a manufacturing method according to a comparative example. The manufacturing method according to the comparative example is different from the manufacturing method according to the present embodiment in that an element pattern and a conductor pattern are formed on base materials by a printing method in place of the photolithography method. According to the printing method, even if attempting to form the conductor pattern in a rectangular shape in cross section on the base material, the conductor pattern is likely to be formed into a collapsed shape (for example, a semi-circular shape or a trapezoidal shape) in such a way as to spread in a width direction on the base material. As a result, the section shape of the obtained coil conductor layer 15c is not a rectangle as illustrated in FIG. 8B.

In contrast, in the manufacturing method according to an embodiment, both the conductor pattern 32 and the element pattern 22 (see FIG. 7) are formed by the photolithography method. Therefore, the section shape of the conductor pattern 32 can be brought closer to a rectangle as compared with the case where the conductor pattern 32 and the element pattern 22 are formed by the printing method. The element pattern 22 can also be accurately formed corresponding to the conductor pattern. As a result, lamination shift and collapse of the conductor pattern 32 are further suppressed, and the section shape of the coil conductor layer 15c approaches a rectangle as illustrated in FIG. 8A.

In the manufacturing method according to the embodiment, after the conductor pattern 32 is transferred, the element pattern 22 is transferred as described in steps S6 and S7 above. As a result, lamination shift and collapse of the conductor pattern 32 can be further suppressed. Since the element forming layer 21 is laminated in steps S5 and S9 above, the laminated coil component 1 in which both end portions in the direction D3 are configured from the element 2 can be manufactured.

The present invention is not limited to the above-described embodiment, and various modifications can be made.

Figure 9A:
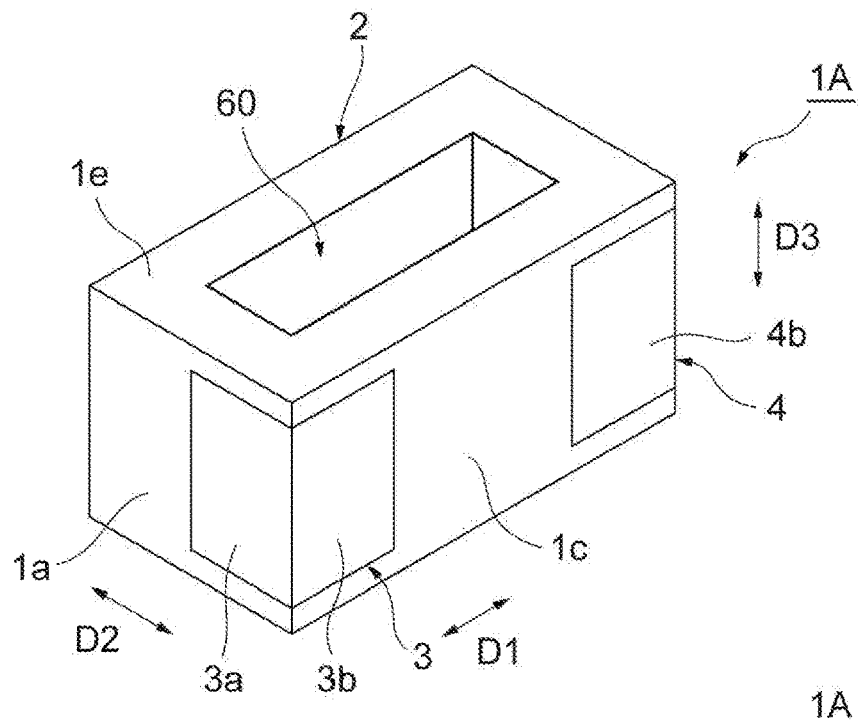
FIGS. 9A and 9B are a perspective view and a sectional view of a laminated coil component manufactured by a method for manufacturing a laminated coil component according to a first modification.
Figure 9B:
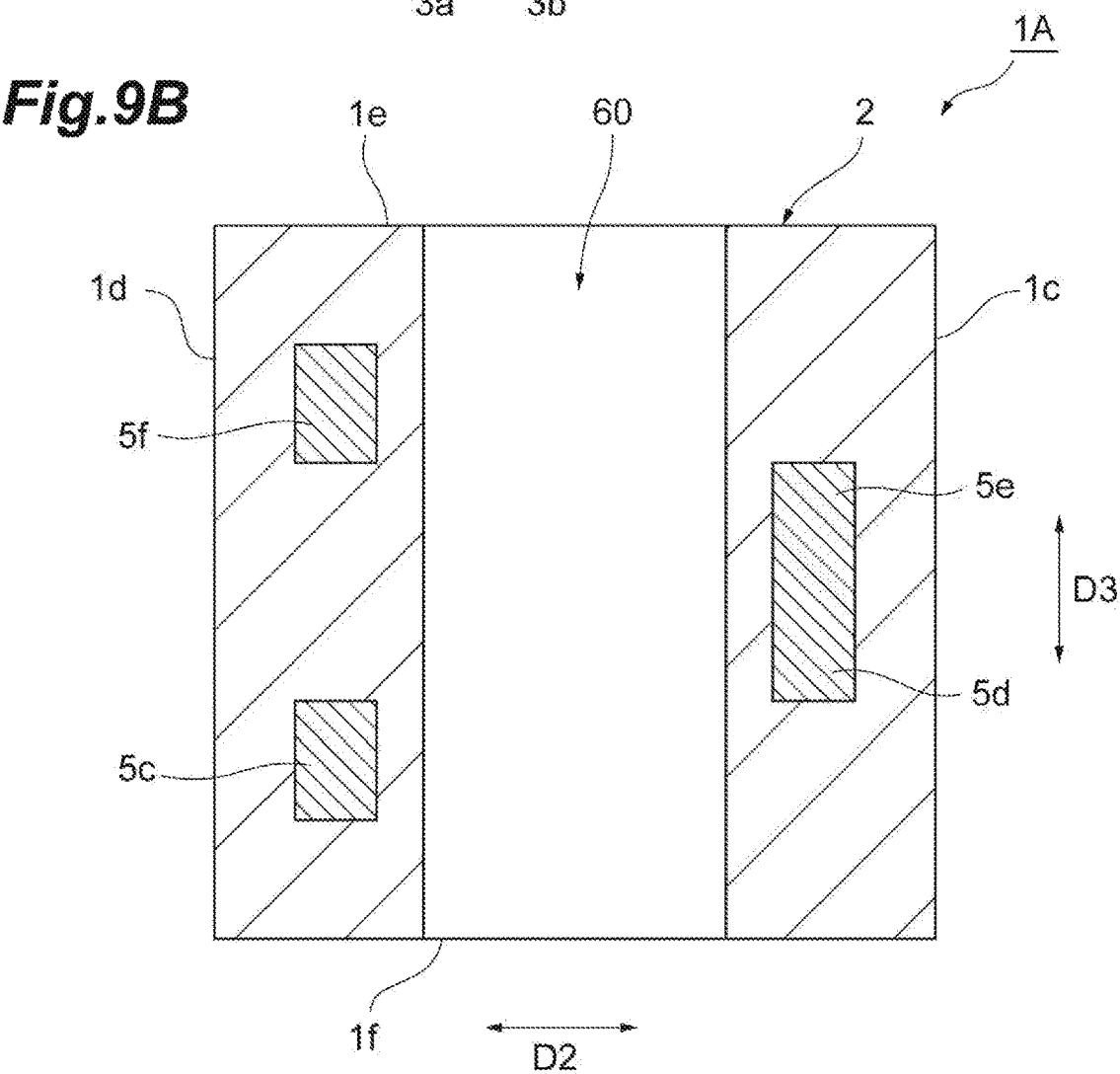

FIG. 9A is a perspective view of a laminated coil component manufactured by a method for manufacturing a laminated coil component according to a first modification. FIG. 9B is a sectional view of the laminated coil component manufactured by the method for manufacturing a laminated coil component according to the first modification. As illustrated in FIGS. 9A and 9B, a laminated coil component 1A according to the first modification is different from the laminated coil component 1 particularly in that it further includes a core portion 60 inside a coil 10 as viewed from a direction D3. The core portion 60 penetrates an element 2 in the direction D3. The core portion 60 is hollow. The laminated coil component 1A is a so-called air-core coil.

A method for manufacturing the laminated coil component 1A is different from the method for manufacturing the laminated coil component 1 in the steps S2, S5 and S9. In the step S2 of the method for manufacturing the laminated coil component 1A, an element pattern 22 is formed such that a shape corresponding to the shape of the core portion 60 has been removed, in addition to the shape of a conductor pattern 32. In the step S2 of the method for manufacturing the laminated coil component 1A, an element pattern 22 is also formed such that only a shape corresponding to the shape of the core portion 60 has been removed. In the steps S5 and S9 of the method for manufacturing the laminated coil component 1A, the element pattern 22 being formed such that only a shape corresponding to the shape of the core portion 60 is transferred in place of the element forming layer 21.

Figure 10A:
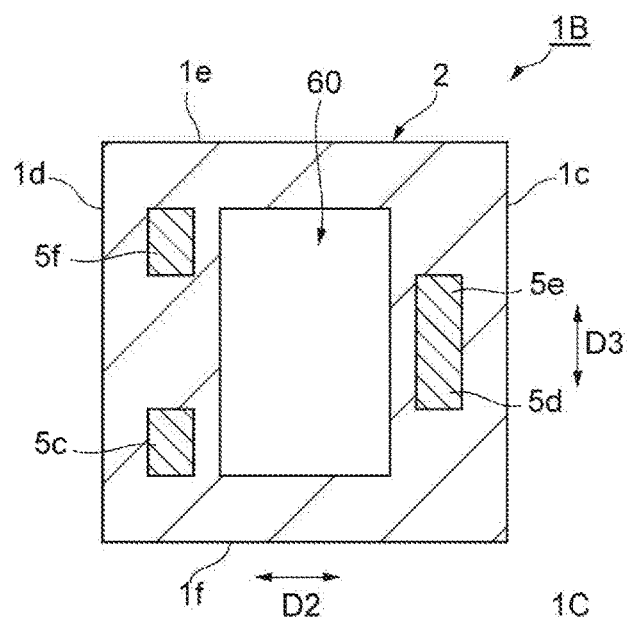
FIGS. 10A to 10C are sectional views of a laminated coil component manufactured by a method for manufacturing a laminated coil component according to a second modification, a third modification, and a fourth modification.

FIG. 10A is a sectional view of a laminated coil component manufactured by a method for manufacturing a laminated coil component according to a second modification. As illustrated in FIG. 10A, a laminated coil component 1B according to the second modification is different from the laminated coil component 1 particularly in that it further includes a core portion 60 inside a coil 10 as viewed from a direction D3. The core portion 60 does not penetrate an element 2 in the direction D3 and is covered with the element 2 at both end portions in the direction D3. The core portion 60 is hollow. The laminated coil component 1B is a so-called air-core coil.

A method for manufacturing the laminated coil component 1B is different from the method for manufacturing the laminated coil component 1 in the step S2. In the step S2 of the method for manufacturing the laminated coil component 1B, an element pattern 22 is formed such that a shape corresponding to the shape of the core portion 60 has been removed, in addition to the shape of a conductor pattern 32.

Figure 10B:
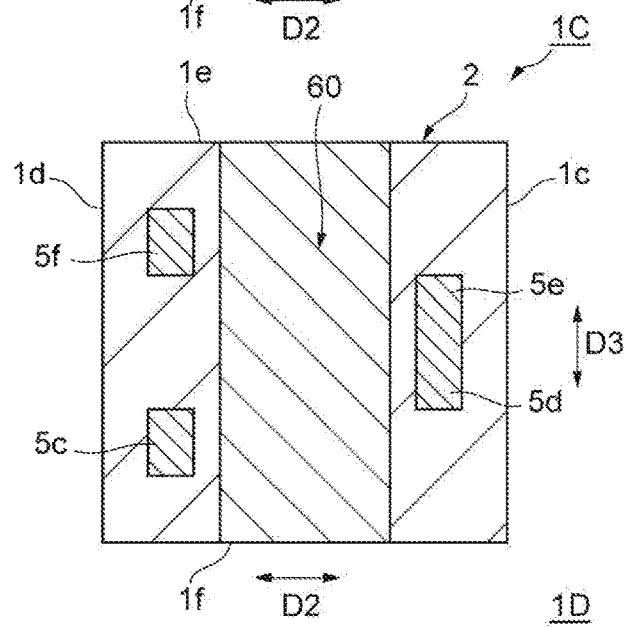

FIG. 10B is a sectional view of a laminated coil component manufactured by a method for manufacturing a laminated coil component according to a third modification. As illustrated in FIG. 10B, a laminated coil component 1C according to the third modification is different from the laminated coil component 1A in that a core portion 60 is not hollow but solid. The core portion 60 is made of a magnetic material different from a configuration material of an element 2, for example.

A method for manufacturing the laminated coil component 1C is different from the method for manufacturing the laminated coil component 1A in further including a step of forming a core portion pattern including the configuration material of the core portion 60 on a base material different from base materials 20 and 30 by a photolithography method, and a step of transferring the core portion pattern formed in the above step onto a support 40, and in laminating the core portion pattern in a direction D3 together with a conductor pattern 32 and an element pattern 22 by repeatedly transferring the core portion pattern on the support 40 together with the conductor pattern 32 and the element pattern 22 in step S8 above. The core portion pattern is formed similarly to the above-described element pattern 22, for example. That is, after a core portion forming layer is formed by applying a paste containing the configuration material of the core portion 60 and a photosensitive material onto the base material, the core portion forming layer is exposed and developed by a photolithography method using a Cr mask, for example. The photosensitive material may be either a negative type or a positive type, and a known photosensitive material can be used.

Figure 10C:
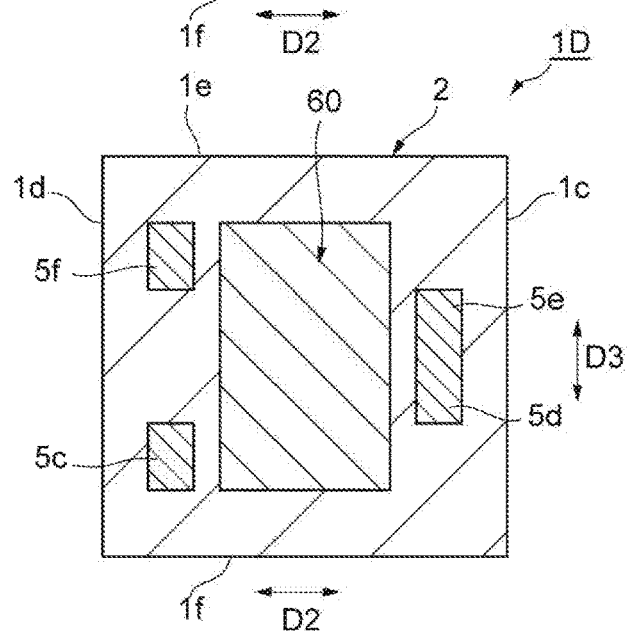

FIG. 10C is a sectional view of a laminated coil component manufactured by a method for manufacturing a laminated coil component according to a fourth modification. As illustrated in FIG. 10C, a laminated coil component 1D according to the fourth modification is different from the laminated coil component 1B in that a core portion 60 is not hollow but solid. The core portion 60 is made of a magnetic material different from a configuration material of an element 2, for example.

A method for manufacturing the laminated coil component 1D is different from the method for manufacturing the laminated coil component 1B in further including a step of forming a core portion pattern including the configuration material of the core portion 60 on a base material different from base materials 20 and 30 by a photolithography method, and a step of transferring the core portion pattern formed in the above step onto a support 40, and in laminating the core portion pattern in a direction D3 together with a conductor pattern 32 and an element pattern 22 by repeatedly transferring the core portion pattern on the support 40 together with the conductor pattern 32 and the element pattern 22 in step S8 above. The core portion pattern is formed by a method similar to the above-described method for manufacturing the laminated coil component 1C, for example.

Figure 11A:
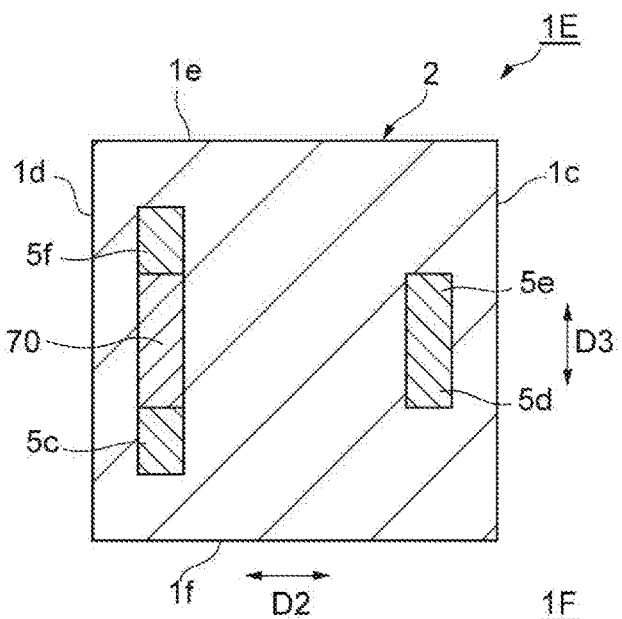
FIGS. 11A to 11C are sectional views of a laminated coil component manufactured by a method for manufacturing a laminated coil component according to a fifth modification, a sixth modification, and a seventh modification.

FIG. 11A is a sectional view of a laminated coil component manufactured by a method for manufacturing a laminated coil component according to a fifth modification. As illustrated in FIG. 11A, a laminated coil component 1E according to the fifth modification is different from the laminated coil component 1 particularly in that it further includes a spacer 70 disposed among coil conductors 5c, 5d, 5e, and 5f in a direction D3. The spacer 70 is made of a magnetic material or a nonmagnetic material different from a configuration material of an element 2, for example.

A method for manufacturing the laminated coil component 1E is different from the method for manufacturing the laminated coil component 1 in further including a step of forming a spacer pattern including the configuration material of the spacer 70 on a base material different from base materials 20 and 30 by a photolithography method, and a step of transferring the spacer pattern formed in the above step onto a support 40, and in laminating the spacer pattern in a direction D3 together with a conductor pattern 32 and an element pattern 22 by repeatedly transferring the spacer pattern on the support 40 together with the conductor pattern 32 and the element pattern 22 in step S8 above. The spacer pattern is formed similarly to the above-described element pattern 22, for example. That is, after a spacer forming layer is formed by applying a paste containing the configuration material of the spacer pattern 70 and a photosensitive material onto the base material, the spacer forming layer is exposed and developed by a photolithography method using a Cr mask, for example. The photosensitive material may be either a negative type or a positive type, and a known photosensitive material can be used.

Figure 11B:
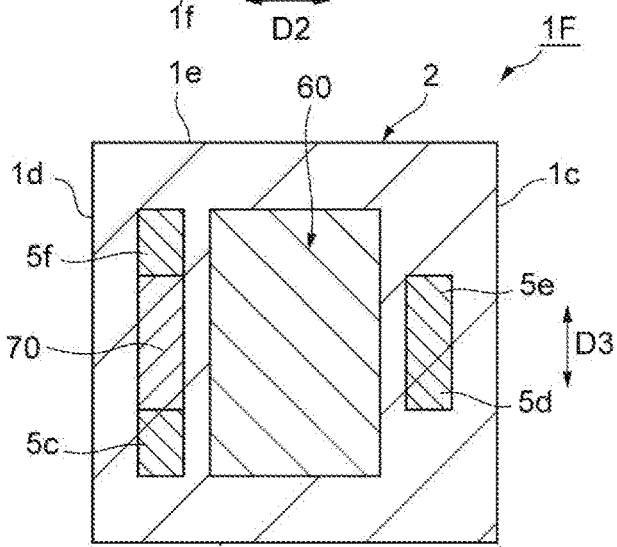

FIG. 11B is a sectional view of a laminated coil component manufactured by a method for manufacturing a laminated coil component according to a sixth modification. As illustrated in FIG. 11B, a laminated coil component 1F according to the sixth modification is different from the laminated coil component 1D particularly in that it further includes a spacer 70 disposed among coil conductors 5c, 5d, 5e, and 5f in a direction D3. The spacer 70 is made of a magnetic material or a nonmagnetic material different from a configuration material of an element 2, for example.

A method for manufacturing the laminated coil component 1F is different from the method for manufacturing the laminated coil component 1D in further including a step of forming a spacer pattern including the configuration material of the spacer 70 on a base material different from base materials 20 and 30 by a photolithography method, and a step of transferring the spacer pattern formed in the above step onto a support 40, and in laminating the spacer pattern in the direction D3 together with a conductor pattern 32 and an element pattern 22 by repeatedly transferring the spacer pattern on the support 40 together with the conductor pattern 32 and the element pattern 22 in step S8 above. The spacer pattern is formed by a method similar to the above-described method for manufacturing the laminated coil component 1E, for example.

Figure 11C:
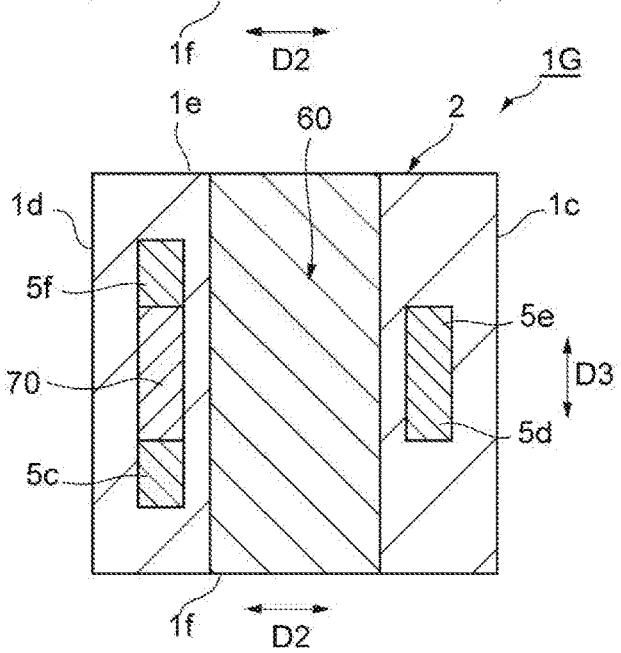

FIG. 11C is a sectional view of a laminated coil component manufactured by a method for manufacturing a laminated coil component according to a seventh modification. As illustrated in FIG. 11C, a laminated coil component 1G according to the seventh modification is different from the laminated coil component 1C particularly in that it further includes a spacer 70 disposed among coil conductors 5c, 5d, 5e, and 5f in a direction D3. The spacer 70 is made of a magnetic material or a nonmagnetic material different from a configuration material of an element 2, for example.

A method for manufacturing the laminated coil component 1G is different from the method for manufacturing the laminated coil component 1C in further including a step of forming a spacer pattern including the configuration material of the spacer 70 on a base material different from base materials 20 and 30 by a photolithography method, and a step of transferring the spacer pattern formed in the above step onto a support 40, and in laminating the spacer pattern in the direction D3 together with a conductor pattern 32 and an element pattern 22 by repeatedly transferring the spacer pattern on the support 40 together with the conductor pattern 32 and the element pattern 22 in step S8 above. The spacer pattern is formed by a method similar to the above-described method for manufacturing the laminated coil component 1E, for example.

In the method for manufacturing the laminated coil component 1, 1A, 1B, 1C, 1D, 1E, 1F, or 1G, the element pattern. 22 and the conductor pattern 32 are not necessarily formed on different base materials and may be formed on a common base material as long as the element pattern 22 and the conductor pattern 32 are separated from each other.

What is claimed is:

1. A method for manufacturing a laminated coil component including an element and a conductor configuring a coil in the element, the method comprising:
    a step of forming a conductor pattern by applying a configuration material of the conductor and a first photosensitive material on a first base and subjecting the configuration material of the conductor and the first photosensitive material to a first photolithography method;
    a step of forming an element pattern by applying a configuration material of the element and a second photosensitive material on a second base and subjecting the configuration material of the element and the second photosensitive material to a second photolithography method such that a shape of the configuration material of the element and the second photosensitive material removed by the second photolithography method corresponds to a shape of the conductor pattern;
    a step of laminating the conductor pattern and the element pattern in a predetermined direction by repeatedly transferring the conductor pattern and the element pattern onto a support;
    a step of performing a thermal treatment for a laminate obtained by the step of laminating; and
    a step of forming an element forming layer that does not include the element pattern on a third base and transferring the element forming layer that does not include the element pattern to a laminated combination of the conductor pattern and the element pattern,
    wherein the first base and the second base are not the same base.

2. The method for manufacturing a laminated coil component according to claim 1, wherein,
    in the step of forming the conductor pattern, a pair of the conductor patterns at least partially overlapping each other when the conductor patterns are layered in the predetermined direction is formed, and
    in the step of laminating, the pair of conductor patterns are laminated in such a way as to be adjacent to each other in the predetermined direction.

3. The method for manufacturing a laminated coil component according to claim 1, wherein,
    in the step of forming the conductor pattern, a pair of conductor patterns entirely overlapping each other when the conductor patterns are layered in the predetermined direction is formed, and
    in the step of laminating, the pair of conductor patterns are laminated in such a way as to be adjacent to each other in the predetermined direction.

4. The method for manufacturing a laminated coil component according to claim 1,
    wherein, in the step of laminating, a first of the element forming layer is transferred to the support, the conductor pattern and the element pattern are next repeatedly transferred to the support and then a second of the element forming layer is transferred to the conductor pattern and the element pattern that are repeatedly transferred to the support.

5. The method for manufacturing a laminated coil component according to claim 1, wherein,
    in the step of laminating, the element pattern is transferred after transferring the conductor pattern.

6. The method for manufacturing a laminated coil component according to claim 1, wherein in the step of laminating, the conductor pattern is transferred from the first base to the support and the element pattern is transferred from the second base to the support.

7. The method for manufacturing a laminated coil component according to claim 1, wherein the step of laminating includes transferring at least two of the element pattern to the support.

8. The method for manufacturing a laminated coil component according to claim 1 wherein:
    the step of forming the conductor pattern includes applying a paste containing the configuration material of the conductor and the first photosensitive material on the first base; and
    the step of forming the element pattern includes applying a paste containing the configuration material of the element and the second photosensitive material on the second base.

9. A method for manufacturing a laminated coil component including an element and a conductor configuring a coil in the element, the method comprising:
- a step of forming a conductor pattern by applying a configuration material of the conductor and a first photosensitive material on a first base and subjecting the configuration material of the conductor and the first photosensitive material to a first photolithography method;
- a step of forming an element pattern by applying a configuration material of the element and a second photosensitive material on a second base and subjecting the configuration material of the element and the second photosensitive material to a second photolithography method such that a shape of the configuration material of the element and the second photosensitive material removed by the second photolithography method corresponds to a shape of the conductor pattern;
- a step of laminating the conductor pattern and the element pattern in a predetermined direction by repeatedly transferring the conductor pattern and the element pattern onto a support; and
- a step of performing a thermal treatment for a laminate obtained by the step of laminating; wherein
- the laminated coil component further includes a core portion inside the coil as viewed from the predetermined direction, and
- in the step of forming the element pattern, the element pattern is formed such that a shape corresponding to a shape of the core portion has been removed.

10. The method for manufacturing a laminated coil component according to claim 9, wherein the method further comprises:
- a step of forming a core portion pattern including a configuration material of the core portion on a fourth base by a third photolithography method,
- wherein, in the step of laminating, the core portion pattern together with the conductor pattern and the element pattern are laminated in the predetermined direction by repeatedly transferring the core portion pattern onto the support together with the conductor pattern and the element pattern.

11. A method for manufacturing a laminated coil component including an element and a conductor configuring a coil in the element, the method comprising:
- a step of forming a conductor pattern by applying a configuration material of the conductor and a first photosensitive material on a first base and subjecting the configuration material of the conductor and the first photosensitive material to a first photolithography method;
- a step of forming an element pattern by applying a configuration material of the element and a second photosensitive material on a second base and subjecting the configuration material of the element and the second photosensitive material to a second photolithography method such that a shape of the configuration material of the element and the second photosensitive material removed by the second photolithography method corresponds to a shape of a conductor pattern;
- a step of forming a spacer pattern including a configuration material of a spacer on a fifth base by a third photolithography method;
- a step of laminating the conductor pattern, the element pattern and the spacer pattern in a predetermined direction by repeatedly transferring the conductor pattern, the element pattern and the spacer pattern onto a support; and
- a step of performing a thermal treatment for a laminate obtained by the step of laminating; wherein
- the laminated coil component further includes the spacer disposed between the conductors in the predetermined direction, and
- in the step of forming the element pattern, the element pattern is formed such that a shape corresponding to a shape of the spacer pattern has been removed.

* * * * *